Nov. 27, 1945.    W. J. MILLER    2,389,629
AUTOMATIC CHANGE SPEED DRIVE FOR POTTERYWARE JIGGERING APPARATUS
Original Filed Jan. 13, 1944    2 Sheets-Sheet 1

INVENTOR.
William J. Miller.
BY
George J. Crominger
ATTORNEY.

Patented Nov. 27, 1945

2,389,629

UNITED STATES PATENT OFFICE 2,389,629

AUTOMATIC, CHANGE SPEED DRIVE FOR POTTERY WARE JIGGERING APPARATUS

William J. Miller, Swissvale, Pa., assignor to Miller Pottery Engineering Company, Swissvale, Pa., a corporation of Pennsylvania Original application January 13, 1944, Serial No. 518,079. Divided and this application January 29, 1944, Serial No. 520,272

11 Claims. (Cl. 25—26)

This invention relates to an automatic change speed drive for potteryware jiggering apparatus.

In the making of high grade dinnerware automatically by machinery such as that shown in my co-pending application Serial No. 518,079, filed January 13, 1944, the production may be diversified as between successive pieces of ware. For instance, a cup, saucer, plate and bowl may be made in the order named.

Jiggering is that process wherein the mold bearing the clay and a profile tool are relatively rotated to form the back of the piece in the case of flatware and the interior of the product in the case of hollow ware. Due to differences in ware size and shape and amount of clay to be removed during the jiggering operation, the relative speed of rotation of the mold and profile tool at which the jiggering operation takes place will be found to vary as between the several types and kinds of ware, this being in accordance with the best practice. For example in making a large plate, the tool speed may be considerably greater than that for a small bowl to effect the proper removal of material and impart the desired polish to the ware surface.

It is among the objects of this invention to provide apparatus for automatically varying the jiggering speed as between successive pieces of ware being made automatically to thereby provide for jiggering each piece of a given class or type of ware at the speed best suited thereto. Another object is to provide for varying the jiggering speed during the jiggering of a given piece of ware to thereby provide the speed adapted to give the best results at any phase of the jiggering operation as for instance between the initial or "rough cutting" phase and the final or "polishing" phase of the operation.

Other objects and advantageous features will be noted in the following written description and accompanying drawings wherein like reference characters designate corresponding parts and wherein.

Figures 1, 3:
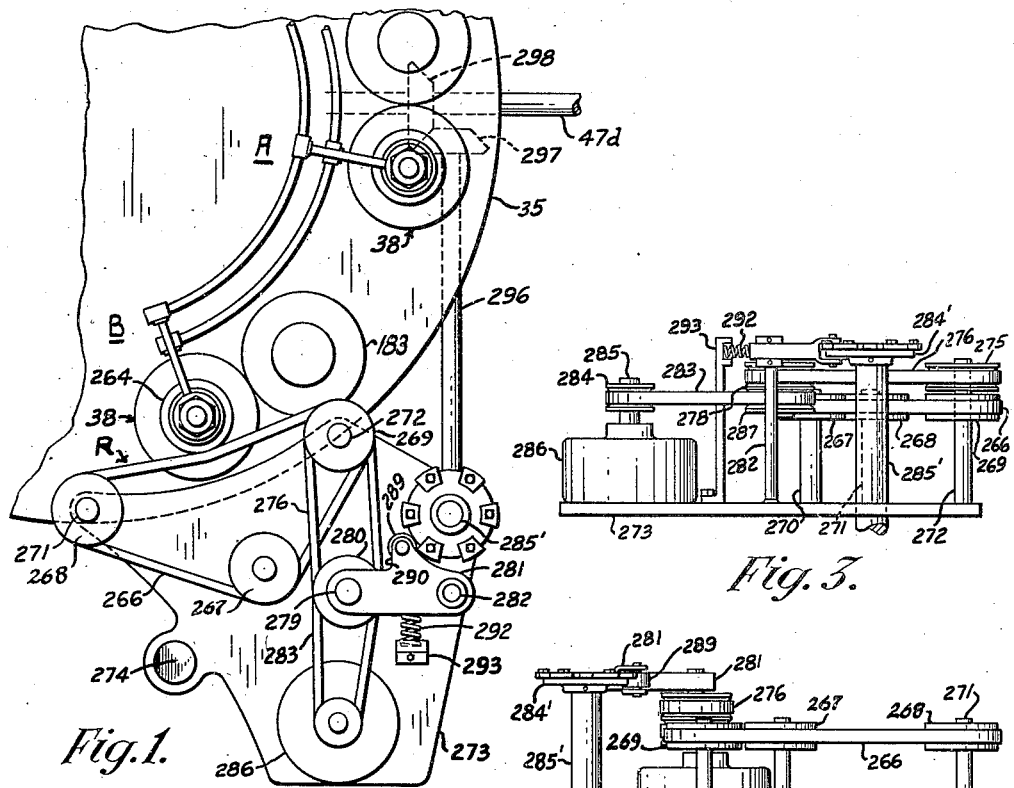
Figure 1 is a plan view of a fragment of a diverse production automatic potteryware forming machine with the automatic change speed jigger tool drive hereof incorporated therein.
Figure 3 is a side elevation of the jigger tool drive.

35 represents the intermittently rotatable table of an automatic jiggering machine driven by shaft 47d, Figure 1. Said machine is described in detail in my co-pending application. The molds M in or on which the ware is formed are carried below and rotate with the table 35 and are moved into position to be raised by a chuck 40, Figure 7, into co-operation with the jigger tool 181 inside housing 38 at the jiggering position after the clay has been first spread over the molding surface of the mold by a die suspended below the table 35 from gear housing 183. The jigger units, as represented by the housings 38 Figure 1 are mounted on and rotate with table 35. One unit, for instance, the one at A, may be tooled and adjusted to make hollow ware while the one at B may be tooled and adjusted to make flatware and so on around the table there being several more such units incorporated in the structure. Thus as the table rotates, the various jigger units are brought in succession to the jiggering position which shall be defined as the zone of the table or platform 273.

Figure 7:
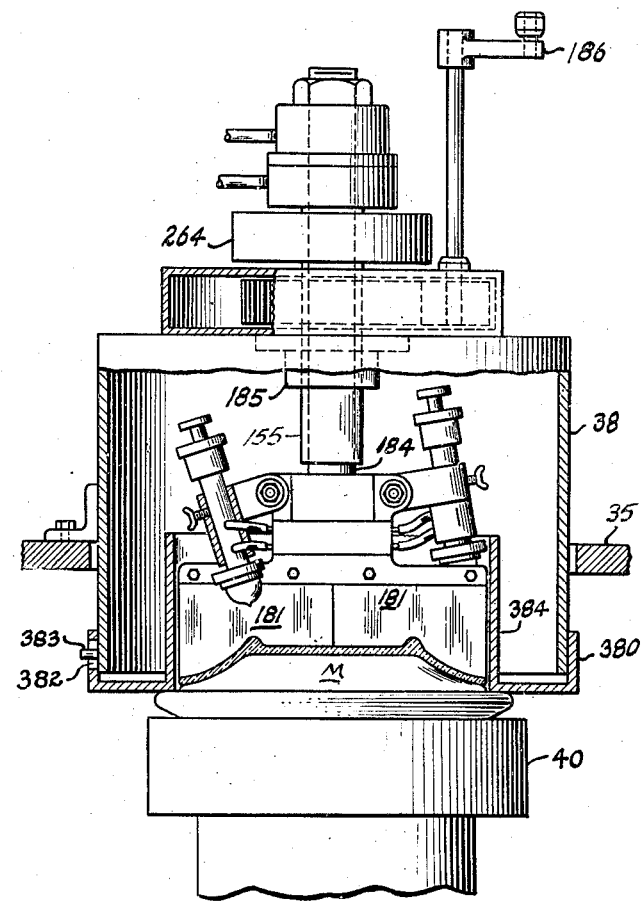
Figure 7 is a detail showing a jigger unit.

Supported by housing 38 is a rotatable spindle 184 on which the tools are mounted, the spindle projecting above the top of the housing, Figure 7. These spindles revolve in a sleeve 155 which is adjustable up and down by handle 186 to vary the height of the tool relative to the mold to thereby regulate the thickness of the ware. Each spindle has a roller 264 fixed thereon above the top of the housing to be engaged and driven by the jigger drive. The surface of roller is preferably of sufficient width to allow for up and down adjustment of the tool without disengaging the jigger drive. The diameter of the rollers of all the jigger units is preferably the same but may be varied if desired in which event those jigger units having smaller diameter rollers would operate from a position closer to the perimeter of the table 35 than the others. Where drive rollers of different diameter are employed, the drive for said rollers may be operated at a constant speed. In this manner variation in the speed of rotation of the several jigger tools may be obtained.

Figures 2, 4:
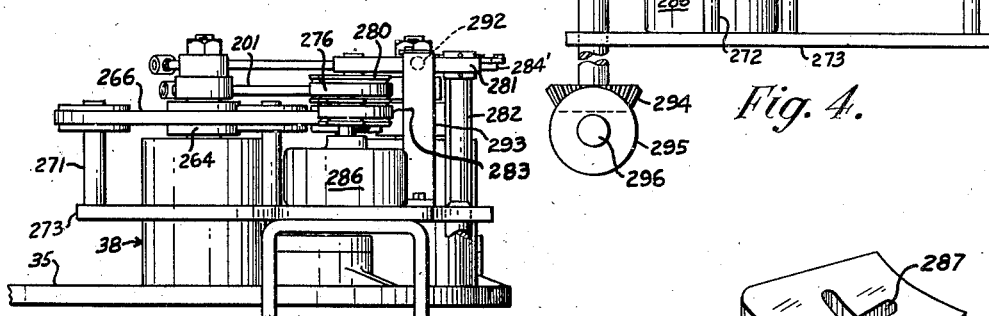
Figure 2 is a rear elevation of the jigger tool drive.
Figure 4 is a front elevation of the jigger tool drive.

To rotate the jigger tool spindle 184 of each jigger, the roller 264, Figure 1, is adapted to be engaged and revolved by a drive belt 266, Figures 2, 3 and 4 stretched between pulleys 267, 268 and 269 on vertical shafts 270, 271 and 272 respectively mounted on a platform 273 adjacent the periphery and above the level of upper table 35 opposite the jiggering location, supported by a column 274, from the base of the machine (not shown). Shafts 270, 271 and 272 are triangularly spaced apart with shaft 272 being adjustable on the platform to take up tension in the belt. The run R of the belt stretched between pulleys 268 and 269 is substantially tangent to the circle of travel of the jigger spindle pulleys 264 about the axis of rotation of table 35 and said pulleys engage the belt as they approach and move to the center of the run R.

Fixed on shaft 272 above pulley 266 is a pulley 275 driven by a belt 276 received between the tapered belt receiving surfaces of an upper disc 280 and the floating center disc 278 of a variable speed pulley fixed on a shaft 279 journaled in an overhead support 281 Figure 2, at the outer end of an angularly movable support 281 Figures 1, 3 and 4 pivotally mounted on a shaft 282 secured to platform 273. A drive belt 283 connected to a pulley 284 on motor shaft 285, of electric motor 286 is received between the lower disc 287 and the central floating disc 278 of the variable speed pulley. By angularly moving support 281 the relative speed of travel of belt 276 may be automatically changed due to the change in radius of curvature of belts 276 and 283 around the variable speed pulley.

Figures 5, 6:
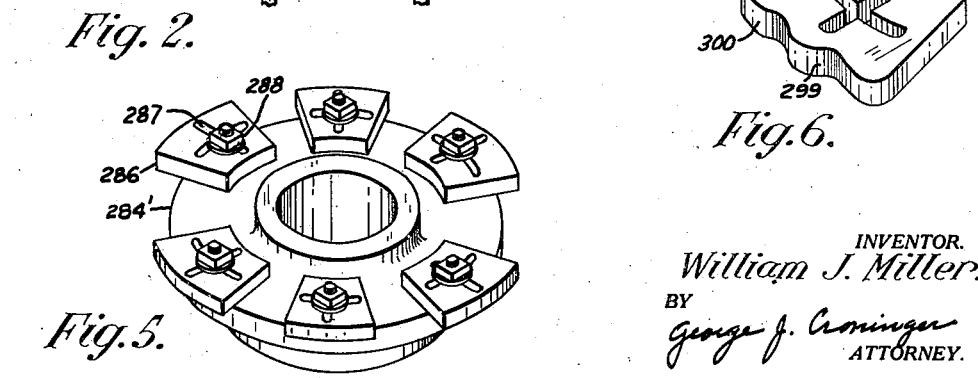
Figure 5 is a detail of the cam disc and control cams.
Figure 6 is a detail of a speed control cam.

Since the speed of rotation of the jigger spindle 184 and hence the speed of rotation of the jigger tool, is not the same for all types, sizes and classes of ware and is subject to variation, I propose to automatically regulate the speed of rotation of each jigger spindle to that best suited to the work and in this connection, have provided a cam disc 284′, Figure 5 mounted on a shaft 285′ Figure 1 with a plurality of radially disposed cams 286, one for each jigger unit, Figure 6 having cross slots 287 for radial and circumferential adjustment on attaching bolts 288. The radial position of the cams determines the amount of variation in speed of the jigger spindles and the circumferential setting the instant of initiation of the drive. The length of the cam surface determines the duration of the drive at a given speed and these factors may vary as between individual jigger units.

As these cams rotate, they engage and depress roller 289 Figure 1 on a projection 290 of support 281 to angularly move said support against the tension of a spring 292 mounted in a holder 293 bolted to the platform 273. This causes the speed of travel of the jigger spindle drive belt 266 to change automatically as pulleys 264 approach the jiggering position and engage belt 266.

Cam disc 284′ is rotated by shaft 285 which is driven continuously and caused to make one complete revolution in the time required for the upper table 35 to make one complete revolution by a gear 294 fixed thereon, Figure 4 driven by a gear 295 on shaft 296 which is driven by continuously rotating shaft 47E by gears 297 and 298, Figure 1.

If it is desired to vary the speed of rotation of any one of the jigger chuck spindles during the jiggering operation, the curvature of the cam surface may be developed to provide the desired change, for instance by one or more reverse curves 299, Figure 6, thus to decrease the speed during the initial or rough cutting period and increase the speed thereafter, or the radius of curvature may be increased toward the trailing end of the surface as at 300 to provide for increasing the speed of rotation of the jigger tool beyond that necessary for jiggering just prior to completion of the jiggering operation and for a short period thereafter if desired, in order to throw off any stray bits of scrap clay which may cling to the tool. If desired the speed may be reduced at the time the tool separates from the clay on mold M to avoid distortion of the bead.

The open bottom housing 38 which encloses the jigger unit, Figures 1 and 7, is carried by the table 35 and projects through an oversize hole slightly in rear of the perimeter of table 35. The jigger unit is capable of a limited amount of adjustment in centering the jigger tool on a vertical axis of the chuck 40 therebelow.

Attached to the lower end of the housing is a replaceable casing 380 having an inner sleeve 384 surrounding the jigger tool 181. This casing co-operates with the jigger tool in directing the scrap clay produced during jiggering into a stationary chute outside the perimeter of the table. The housing has a bayonet slot 382 and pin 383 connection with the casing.

It will be understood that the present drive could be arranged so as to act on the chucks 40 and cause them to revolve relative to the tools 181 merely by changing the location of the drive.

I claim:

1. In apparatus for jiggering potteryware, a plurality of jiggering mechanisms each including a rotatable jigger spindle having a ware forming implement mounted thereon, movable supporting means for said mechanisms for transporting them to a jiggering position, and a variable speed jigger spindle drive mechanism common to all spindles at said position automatically operable to rotate each jigger spindle, one at a time, in succession.

2. In apparatus for jiggering potteryware, a plurality of rotatable profiles movable in succession into and out of a fabricating station, a spindle for each profile for rotatably supporting the same, a variable speed drive for said spindles automatically operable to vary the speed of rotation of selected profiles whilst performing a fabricating operation and the speed of rotation of said profiles as between successive profiles, a source of power and means for connecting said source to said drive.

3. In apparatus for jiggering potteryware, a plurality of rotatable jigger tools, a rotatable table for transporting said jigger tools to a fabricating position, a drive belt at said position operable to rotate said jigger tools, a source of power, a drive connection between said source of power and said drive belt including a speed varying device, and cam actuated means for operating said speed varying device in timed relation with the rotation of said table.

4. In apparatus for jiggering potteryware, a plurality of rotatable jigger tools movable into and out of a fabricating station, a flexible member for transmitting rotation to said jigger tools at said station, and means for driving said flexible member including a source of power, a speed varying means and means for automatically actuating said speed varying means.

5. In apparatus for jiggering potteryware, a plurality of jiggering mechanisms each including a rotatable jigger spindle having a fabricating tool thereon, movable supporting means for transporting said jiggering mechanisms to a jiggering position and a variable speed drive at said position for rotating said jigger spindles having cam actuated means for automatically varying the speed of said drive.

6. In apparatus for jiggering potteryware, a plurality of jiggering mechanisms each including a rotatable jigger spindle having a fabricating implement thereon, a rotatable support for said mechanisms for transporting them to a ware fabricating station and a variable speed drive at said station for rotating said jigger spindles including a speed varying device and a plurality of cams operable to actuate said device.

7. In apparatus for jiggering potteryware, a plurality of rotatable profiles each to be actuated in successive order, at a jiggering station a drive for rotating said profiles and means for varying the speed of said drive including cams each having a surface developed to produce a predetermined speed of rotation for each profile and means for causing each cam to be effective on the drive as the profile with which it is associated reaches the jiggering position.

8. In apparatus for jiggering potteryware, a jigger tool drive for rotating a plurality of jigger tool spindles including a source of power, a variable speed transmission, a cam disc having cams thereon each having a surface effective on, and developed to produce a change in the speed of operation of the variable speed transmission and means for rotating said cam disc.

9. In apparatus for jiggering potteryware, a plurality of rotatable profiles mounted on a rotatable table for carrying them to a jiggering position, a drive for said profiles to be engaged therewith in successive order, means for varying the speed of rotation of the several profiles and means, operating in timed relation with the rotation of said table for actuating said speed varying means.

10. Jiggering apparatus comprising a plurality of rotatable profiles, some of which are to be rotated at different jiggering speeds than others, a support or carrying them through a fabricating zone, one after the other, and a variable speed drive for rotating said profiles including a driven member adjacent the fabricating zone relative to which the profiles are moved into and out of the zone and a controller synchronized with the movement of the support for varying the speed of the driven member to thereby vary the speed of rotation of the profiles as between profiles.

11. Jiggering apparatus comprising a plurality of rotatable profiles, some of which are to be rotated at different jiggering speeds than others, an angularly movable support for carrying them through a fabricating zone, one after the other, a drive for rotating said profiles mounted alongside the support including a regulable control for varying the speed of the drive and means for actuating the control synchronized with the movement of the support and operable to vary the speed of the drive during angular movement of the table.

WILLIAM J. MILLER.